United States Patent [19]

Bookwalter

[11] Patent Number: 4,737,371

[45] Date of Patent: Apr. 12, 1988

[54] PROCESS FOR STABILIZING WHOLE CEREAL GRAINS

[75] Inventor: George N. Bookwalter, Peoria, Ill.

[73] Assignee: The United States of America as represented by the Secretary of Agriculture, Washington, D.C.

[21] Appl. No.: 635,945

[22] Filed: Jul. 24, 1984

[51] Int. Cl.$^4$ .............................................. A23L 1/172
[52] U.S. Cl. ..................................... 426/462; 426/508
[58] Field of Search ............... 426/618, 507, 419, 511, 426/520, 462, 443, 481, 508, 510

[56] References Cited

U.S. PATENT DOCUMENTS

| | | | |
|---|---|---|---|
| 2,585,978 | 2/1952 | Van Atta et al. | 99/153 |
| 2,725,300 | 11/1955 | Cryns | 426/511 |
| 2,745,748 | 5/1956 | McCashen | 426/443 |
| 2,930,697 | 3/1960 | Miller | 426/462 |
| 3,342,607 | 9/1967 | Hickey | 426/508 |
| 3,457,084 | 7/1969 | Weiss | 426/462 |
| 3,474,722 | 10/1969 | Watson | 426/481 |
| 3,477,855 | 11/1969 | Freeman | 426/481 |
| 3,498,796 | 9/1966 | Bailey | 426/507 |
| 3,640,206 | 2/1972 | Moisescu | 426/462 |
| 3,734,752 | 5/1973 | Headley | 426/481 |
| 3,962,479 | 6/1976 | Coldren | 426/532 |
| 4,329,371 | 5/1982 | Hart | 426/481 |
| 4,413,018 | 11/1983 | Webster | 426/618 |

FOREIGN PATENT DOCUMENTS

| | | | |
|---|---|---|---|
| 131707 | 9/1946 | Australia | 426/511 |
| 525215 | 1/1956 | Canada | 426/508 |
| 526049 | 6/1956 | Canada | 426/520 |

OTHER PUBLICATIONS

Kent, 1975, The Technology of Cereals, 2nd Edition, Pergamon Press, Oxford, pp. 241–255.
W. Miecke et al., "Steaming and Flaking of Grain Products," Getreide, Mehl und Brot, 33(5): 123–127, (1979).
R. Heiss, "Origin and Prevention of Undesirable Flavor Changes in Oat Products During Storage," Food Technology, pp. 688–692, (Dec. 1958).
N. L. Kent, "Recent Research on Oatmeal," Cereal Sci. Today, 2(4): 83–91, (Apr. 1957).
Pomeranz, 1971, Wheat Chemistry and Technology, AACC, pp. 164–172 and 478–481.
Whitaker et al., 1977, Food Proteins, AVI Publishing Co., pp. 28–35.
Potter, 1973, Food Science, AVI Publishing Co., pp. 503–506.
Wagenknecht, 1959, Food Research, 24:539.
Gardner et al., 1969, Cereal Chemistry, 46:626.

Primary Examiner—Raymond Jones
Assistant Examiner—Carolyn Paden
Attorney, Agent, or Firm—M. Howard Silverstein; David G. McConnell; Curtis P. Ribando

[57] ABSTRACT

Cereal grains are protected from enzymatic deterioration by inactivation of lipolytic and oxidative enzymes without alteration of the physical and functional properties. The method involves heat treating either the intact grain or the separated germ fraction at a moisture content of about 13–17% and a temperature in the range of about 95°–110° C. The whole grain product and high-fat flour prepared therefrom are characterized by an extended shelf-life and high nutritional value.

9 Claims, No Drawings

PROCESS FOR STABILIZING WHOLE CEREAL GRAINS

BACKGROUND OF THE INVENTION

1. Field of the Invention

Most cereal grains can be stored for long periods of time without substantial quality changes if the kernels remain intact. However, once the grain is subjected to grinding or cracking, flavor quality rapidly deteriorates due to lipid enzymes that cause hydrolytic and oxidative changes typified by the onset of bitterness and rancidity. Processing methods such as extrusion cooking or pressing on heated rolls used to inactivate lipid enzymes are known to cause drastic changes in the baking properties as well as in other functional properties of the milled product. Therefore, the solution to storage instability has focused on removal of germ and other lipid material by dry milling. This approach results in substantial losses in nutritional value and yield. With grains such as millet, which are very small and have a hard endosperm structure, separation is especially difficult.

2. Description of the Prior Art

Previous attempts to stabilize whole cereal grains against enzymatic and oxidative changes seemingly have centered on grains which are targeted for end use in an unmilled state wherein the functional properties are of no consequence. For example, Van Atta et al., U.S. Pat. No. 2,585,978, shows a method of stabilizing rice against rancidity which normally ensues after hulling as the result of hydrolysis of the triglyceride oils in the bran layer to fatty acids. Freshly harvested rice at its natural moisture content is blanched with moist air at 185°–212° F. (85°–100° C.) for about ½ to 15 minutes to inactivate lipase. The treated rice is thereafter dried to a moisture content of 10–15% and optionally milled only to remove the hull. In a somewhat similar process disclosed by Webster, U.S. Pat. No. 4,413,018, lipolytic reactions are suppressed in oats by treatment with wet heat at approximately 250° F. (121° C.) for 10–20 minutes. Under these conditions, oxidative rancidity as indicated by peroxide content is also minimized. The treated oats are thereafter stored and utilized as an unmilled grain product with no special functional requirements.

SUMMARY OF THE INVENTION

I have now surprisingly discovered that by carefully controlling the conditions of treatment, the lipolytic and oxidative enzymes of whole cereal grain can be inactivated without destruction of the functional properties. The treated grain can thereby be milled into a shelf-stable, high-fat flour and thereafter processed into finished products having organoleptic and textural properties at least as good as products prepared from degerminated flours or from freshly milled whole grain flours. The method of the invention comprises heating the grain at a moisture content of about 13–17% to a temperature in the range of about 95°–110° C. until the peroxidase is inactivated, and then cooling the grain to ambient temperature. The product can thereafter be stored indefinitely before or after milling.

In accordance with this discovery, it is an object of the invention to convert whole grains to shelf-stable flours having flavorable functional properties.

Another object of the invention is to increase the milling yield from whole grain and to enhance the nutritional value of both the flour and the food products prepared therefrom.

A further object of the invention is to provide a simple, economical, and commercially attractive method for suppressing the deleterious enzymatic reactions in cereal grains, especially in those grains which are not practical to degerminate.

Other objects and advantages of the invention will become readily apparent from the ensuing description.

DETAILED DESCRIPTION OF THE INVENTION

The method of the invention is applicable to all common cereal grains including corn, wheat, oats, rice, sorghum, millet, barley, rye, and the like. It is, of course, especially beneficial in the treatment of millet and other small grains which are not readily degerminated by conventional methods, and which are most readily handled in whole and intact form. The term "whole" as used herein means that both the endosperm and germ are present, though the hull, husk, and bran layers may have been previously removed. The term "intact" is used in the sense that the kernels are substantially unfractured. In the case of large-grained cereals and those which are otherwise easily degerminated, such as corn and wheat, it would be advantageous to first mill the grain and then treat only the separated germ in accord with the instant process. Thereafter, the germ can be recombined with the endosperm to produce a stable, whole-grain product. It can be appreciated that by treating only the germ fraction, equipment and processing costs would be held to a minimum.

In either of the aforementioned embodiments, the material in the process stream must have a moisture content in the range of about 13–17%, and preferably 14–16%, on dry weight basis. The moisture can be adjusted by drying or else tempering with added water as necessary by any conventional method as known in the art. At moistures below about 13%, the peroxidase is not inactivated, and above about 17% the physical characteristics and functional properties are noticeably altered.

Once the cereal is moistened to the proper level, it is heated to a peroxidase-inactivation temperature within the range of about 95°–110° C. and preferably in the range of 97°–100° C. The material must be held at temperature only momentarily for complete peroxidase inactivation. To minimize the possibility of extraneous reactions, the periods of applying heat and cooling during which the grain is above ambient temperature should be as short as possible. The equipment utilized for the heating step is not particularly critical, provided that it does not subject the material to physical pressure or shear which would disrupt the starch granules or any other entity of the grain's microstructure. For a continuous operation, a steam-jacketed paddle conveyor is effective. After cooling to about ambient temperature, the treated material can be stored as is, or else further processed. For instance, either the unmilled grain or the recombined fractions can be ground into a flour prior to storage.

By virtue of the treatment, the peroxidase enzymes of the cereals are completely inactivated and the lipase activity as measured by the fat acidity level is also significantly reduced. The apparent retention of natural antioxidants further contributes to the product's extended shelf-life without development of bitter and rancid off-flavors. Notwithstanding the chemical changes, the physical nature of the treated grain remains virtually unaltered as evidenced by birefringence, water absorption index, water solubility index, density, and initial cold visco-amylograph viscosity. Accordingly, flours prepared therefrom have the same functional properties as those prepared from degerminated grains. These flours are therefore useful for the same applications as their conventional counterparts, such as in gels, doughs, baked products, and the like. Moreover, their nutritional value is enhanced by virtue of the germ which is rich in protein, vitamins, and minerals.

The following examples are intended only to further illustrate the invention and are not intended to limit the scope of the invention which is defined by the claims.

EXAMPLE 1

Forty-three kilograms of whole white proso millet grain at a moisture content of 11.5% was tempered for 16 hours with a sufficient amount of water to raise the moisture content to 15.0%. For each run, an 8–9 kg. sample of the tempered millet was metered at a rate of 30.8 kg./hour into the top stage of a continuous, two-stage steam-jacketed paddle conveyor, equipped with 1.8 m×15.2 cm. screws driven by a single variable speed motor. The stages were independently heated, and the millet could be removed from an exit port at the end of either stage depending on the desired temperature of the exiting material. For the treatment temperatures ranging from 68.9° to 98.9° C., the holding times ranged from 4 to 12 minutes. After cooling to room temperature, the samples were assayed for the presence of peroxidase by the standard method as described in USDA Wheat-Soy Milk Announcement WSM-1, Amendment 1 of Apr. 20, 1983. The remaining material of each sample was divided into two portions, one of which was cracked by coarse grinding, and the other of which was left uncracked. Both portions were assayed for fat acidity by the AACC Method reported in *Cereal Laboratory Methods*, 7th ed., American Association of Cereal Chemists (1962) at 0 days and at 56 days of storage at 49° C. The results are reported in Table I, below.

EXAMPLE 2

Fifty kilograms of whole white proso millet grain at a moisture content of 11.8% was tempered for 16 hours with a sufficient amount of water to raise the moisture content to 15.0%. The tempered millet was metered at a rate of 29.4 kg./hour into the top stage of the steam-jacketed paddle conveyor described in Example 1. After a total hold time of 12 minutes, the material attained a temperature of 97° C. and was recovered from the exit port of the bottom stage. The results of assay by the peroxidase test were negative.

Both treated and untreated millet were milled with a 4-break corrugated roll system. Each break was sifted through U.S. Standard Screens ranging from #12 to #50 along with three aspirations to separate germ, bran, and endosperm. Medium and fine grits were combined with germ fractions to achieve a high-fat flour. Low-fat flour was obtained by the aforementioned 4-break system wherein the millet moisture was adjusted to 22%, and then the grain milled within 30 minutes to separate the endosperm from the hull and germ fractions. Product yield was 80% for the high-fat, germ-containing flour, and 50% for the low-fat flour. The fat acidity values for the treated, high-fat flour of the invention are compared to the values of the remaining flours as a function of storage time at 49° C. in Table II, below.

TABLE I

| Assay | Millet | Sample treatment[a] | | | | Untreated |
| | | 1A 68.9° C. | 1B 80° C. | 1C 88.9° C. | 1D 98.9° C. | |
| --- | --- | --- | --- | --- | --- | --- |
| Peroxidase | — | + | + | + | − | + |
| Fat acidity | Whole - 0 days | 52 | 41 | 35 | 46 | 50 |
| Fat acidity | Whole - 56 days | 96 | 73 | 45 | 37 | 70 |
| Fat acidity | Cracked - 0 days | 73 | 45 | 38 | 43 | 71 |
| Fat acidity | Cracked - 56 days | 279 | 205 | 86 | 65 | 224 |

[a]Tempered to 15.0% moisture.

Flavor scores as determined by a trained flavor evaluation panel are also reported in Table II. Table III reports the nutritional properties of the respective flours. The physical characteristics of the flours are given in Table IV. Water absorption index and water solubility index were determined by the method of Anderson et al. [Cereal Sci. Today 14: 4 (1969)].

EXAMPLE 3

The functional properties of the millet flours prepared in Example 2 were evaluated by preparing "cous cous," a popular food in some African and Middle East countries. Agglomerates were formed by blending the flours with 60% water added during 5 minutes mixing at low speed in a "Hobart" mixer. The agglomerated particles were placed on a perforated shelf in a covered double boiler and stirred occasionally to provide uniform steam cooking. Cooking proceeded until the disappearance of raw millet flavor. Evaluation of the "cous cous" products is reported in Table V, below.

EXAMPLE 4

Sixty-eight kilograms of whole white proso millet grain at a moisture content of 11.5% was divided into two 34-kg. lots, one of which was tempered with a sufficient amount of water to raise the moisture content to 15.0%. Each lot was treated by metering at a rate of 28.3 kg./hour into the top stage of the steam-jacketed paddle conveyor described in Example 1. After a total hold time of 12 minutes, the material attained a temperature of 97° C. and was recovered from the exit port of the bottom stage. By the method described in Example 2, high-fat and low-fat flour samples were prepared from each of the treated lots as well as from 23 kg. of untreated millet at the original 11.5% moisture content. The results of assay for peroxidase and fat acidity are reported in Table VI, below.

EXAMPLE 5

Sixty-eight kilograms of whole white proso millet grain at a moisture content of 11.5% was divided into two 34-kg. lots.

TABLE II

| Sample | Millet flours | Fat acidity values 0 days | 28 days[b] | 56 days[b] | Flavor scores[a] 0 days | 28 days[b] | 56 days[b] |
|---|---|---|---|---|---|---|---|
| 2A | Treated[c] high-fat (invention) | 37 | 66 | 90 | 7.2 | 7.0 | 7.1 |
| 2B | Untreated high-fat (control) | 69 | 330 | 378 | 7.2 | 6.8 | 6.5[d] |
| 2C | Treated[c] low-fat (control) | 24 | 58 | 68 | 6.7 | 6.5 | 6.9 |
| 2D | Untreated low-fat (control) | 95 | 259 | 268 | 7.5 | 6.5[d] | 6.5[d] |

[a] Based on 10-point flavor intensity scale: 10 = excellent; 1 = repulsive.
[b] Stored at 49° C.
[c] Tempered to 15% moisture; 97° C. treatment.
[d] Scores represent a significant flavor decline from the "0 days" value at the 95% confidence level.

TABLE III

| | Millet flour samples | | | | |
|---|---|---|---|---|---|
| Component | 2A Treated[a] high-fat (invention) | 2B Untreated high-fat (control) | 2C Treated[a] low-fat (control) | 2D Untreated low-fat (control) | Untreated whole millet (baseline) |
| Moisture (%) | 9.8 | 10.4 | 9.6 | 10.1 | 12.4 |
| Protein (%) | 14.5 | 14.4 | 12.8 | 12.8 | 13.3 |
| Available lysine (%)[b] | 1.8 | 1.7 | 1.4 | 1.5 | 1.8 |
| Fat (%) | 4.3 | 3.7 | 1.7 | 1.8 | 4.8 |
| Crude fiber (%) | 2.8 | 3.3 | 1.6 | 1.5 | 7.5 |
| Ash (%) | 1.6 | 1.6 | 0.6 | 0.6 | 3.6 |
| Vitamins (mg./100 g.) | | | | | |
| Thiamine | 0.42 | 0.40 | 0.11 | 0.13 | 0.49 |
| Riboflavin | 0.17 | 0.17 | 0.11 | 0.12 | 0.18 |
| Niacin | 5.4 | 5.5 | 3.8 | 4.0 | 5.6 |
| Minerals (μg./g.) | | | | | |
| Iron | 39 | 42 | 13 | 16 | 88 |
| Calcium | 76 | 50 | 42 | 24 | — |
| Zinc | 28 | 22 | 17 | 21 | 22 |
| Phosphorus | 725 | 602 | 326 | 292 | 1702 |

[a] Tempered to 15% moisture; 97° C. treatment.
[b] % of protein.

TABLE IV

| Sample | Millet flours | Water absorption index (g. gel/g. meal) | Water solubility index (%) | Bire-fringence | Brabender viscosity units Start | At 95° C. | At 50° C. |
|---|---|---|---|---|---|---|---|
| 2A | Treated[a] high-fat (invention) | 2.3 | 1.9 | normal | 10 | 190 | 410 |
| 2B | Untreated high-fat (control) | 2.2 | 2.3 | normal | 10 | 210 | 610 |
| 2C | Treated[a] low-fat (control) | 2.3 | 1.3 | normal | 10 | 290 | 590 |
| 2D | Untreated low-fat (control) | 2.1 | 1.3 | normal | 10 | 310 | 700 |

[a] Tempered to 15% moisture; 97° C. treatment.

TABLE V

| Sample | Millet flours | Preparation time (min.) | Agglomeration characteristics | Visual color[a] | Texture and flavor |
|---|---|---|---|---|---|
| 3A | Treated[b] high-fat (invention) | 20 | Fluffy, normal discrete particles | 100 | Tender, normal cereal |
| 3B | Untreated high-fat (control) | 25 | Sl. sticky, large particles | 99.5 | Gritty, normal cereal |
| 3C | Treated[b] low-fat (control) | 20 | Fluffy, uniform particles | 99.5 | Tender, normal cereal |
| 3D | Untreated low-fat (control) | 25 | Sl. sticky, nonuniform particles | 99.5 | Chewy, normal cereal |

[a] 100 = light tan crumb color; 99 = tan.
[b] Tempered to 15% moisture; 97° C. treatment.

TABLE VI

| Sample | Grain moisture (%) | Millet flours | Peroxidase | Fat acidity values 0 days | 56 days |
|---|---|---|---|---|---|
| 4A | 15.0 | Treated[a] high-fat (invention) | — | 34 | 87 |
| 4B | 11.5 | Treated[a] high-fat (control) | + | 38 | 184 |
| 4C | 11.5 | Untreated high-fat (control) | + | 105 | 335 |
| 4D | 15.0 | Treated[a] low-fat (control) | — | 23 | 59 |
| 4E | 11.5 | Treated[a] low-fat (control) | + | 27 | 151 |
| 4F | 11.5 | Untreated low-fat (control) | + | 120 | 254 |

[a] 97° C. treatment.

One lot was tempered to 13% moisture and the other to 17% moisture. To test the effect of temperature, each lot was further split into two samples which were treated by metering at a rate of 26-29 kg./hour into the top stage of the steam-jacketed paddle conveyor described in Example 1. The sample material was recovered from the exit port of the bottom stage at the temperatures indicated in Table VII. The results of assay for peroxidase activity and birefringence are reported in the table.

EXAMPLE 6

One hundred twelve kilograms of yellow dent corn at a moisture content of 11.5% was tempered to 15% moisture and divided into four samples. The samples were treated by metering at a rate of 28.8 kg./hour into the top stage of the steam-jacketed paddle conveyor described in Example 1. The material was recovered from the exit port of the bottom stage at the temperatures indicated in Table VIII. The results of assay for peroxidase activity and birefringence are reported in the table.

EXAMPLE 7

Eighty-five kilograms of yellow dent corn at a moisture content of 11.5% was divided into two equal lots. One lot was tempered to 13% moisture and the other to 17% moisture. To test the effect of temperature, each lot was further divided into two samples which were treated by metering at a rate of 24.3 kg./hour into the top stage of the steam-jacketed paddle conveyor described in Example 1. The material was recovered from the exit port of the bottom stage at the temperatures indicated in Table IX. The results of assay for peroxidase activity and birefringence are reported in the table.

EXAMPLE 8

Corn bread was prepared from high-fat corn meal obtained by grinding the 97° C.-treated material of Example 6D. A control bread was similarly prepared from untreated high-fat corn meal. The formulation and procedure were as follows:

| Ingredients | Formulation (g.) |
|---|---|
| Corn meal, high-fat | 175 |
| Wheat flour, all-purpose | 55 |
| Sugar | 20 |
| Salt | 5 |
| Baking powder | 13 |
| Milk, fluid | 265 |
| Egg, whole | 50 |
| Vegetable shortening | 17 |
| | 600 |

One hundred fifteen grams milk and the remaining ingredients were blended at low speed in a laboratory mixer for 1 minute. The shortening was added and blending continued for ½ minute. After adding the balance of the milk and blending for 1½ minutes, the mixture was baked for 24 minutes at 232° C. Evaluation of the corn bread is shown in Table X.

EXAMPLE 9

Eighty-two kilograms of hard red spring wheat at a moisture content of 11.8% was divided into two equal lots, one of which was tempered to 15% moisture. Each lot was further divided into four samples which were treated by metering at a rate of 28-29 kg./hour into the top stage of the steam-jacketed paddle conveyor described in Example 1. The material was recovered from the exit port at the temperatures indicated in Table XI. The results of assay for peroxidase activity and birefringence are reported in the table.

EXAMPLE 10

Thirty-four kilograms of hard red spring wheat at a moisture content of 11.8% was tempered to 15% moisture and divided into two samples. One sample was treated at 97° C. in the same manner as Sample B of Example 9, and the other was left untreated. The wheat samples were thereafter milled into whole wheat flour and evaluated as reported below in Table XII.

TABLE VII

| Sample | Grain moisture (%) | Sample treatment (°C.) | Peroxidase | Birefringence |
|---|---|---|---|---|
| 5A | 13 | 97 | + | normal |
| 5B | 13 | 108 | − | normal |
| 5C | 17 | 97 | − | normal |
| 5D | 17 | 105 | − | normal |

TABLE VIII

| Sample | Grain moisture (%) | Sample treatment (°C.) | Peroxidase | Birefringence |
|---|---|---|---|---|
| 6A | 15 | 69 | + | normal |
| 6B | 15 | 80 | + | normal |
| 6C | 15 | 89 | + | normal |
| 6D | 15 | 97 | − | normal |

TABLE IX

| Sample | Grain moisture (%) | Sample treatment (°C.) | Peroxidase | Birefringence |
|---|---|---|---|---|
| 7A | 13 | 97 | − | normal |
| 7B | 13 | 108 | − | normal |
| 7C | 17 | 97 | − | normal |
| 7D | 17 | 106 | − | normal[a] |

[a]Slight swelling of starch granules noted.

TABLE X

| | High-fat corn meal | |
|---|---|---|
| | 8A Treated[a] | 8B Untreated |
| Handling properties | normal | normal |
| Volume | normal | normal |
| Crumb color[b] | 99 | 100 |
| Grain and texture | Medium cells, sl. coarse | Close cells, sl. coarse |
| Flavor score[c] | 8 (No aftertaste, clean, corny) | 6 (Sl. aftertaste, sl. bitter) |

[a]Tempered to 15% moisture; 97° C. treatment.
[b]100 = light yellow color; 99 = yellow.
[c]Based on 10-point flavor intensity scale: 10 = excellent; 1 = repulsive.

TABLE XI

| Sample | Grain moisture (%) | Sample treatment (°C.) | Peroxidase | Birefringence |
|---|---|---|---|---|
| 9A | 15.0 | 106 | − | normal |
| 9B | 15.0 | 97 | − | normal |
| 9C | 15.0 | 93 | + | normal |
| 9D | 15.0 | 87 | + | normal |
| 9E | 11.8 | 97 | + | normal |
| 9F | 11.8 | 93 | + | normal |
| 9G | 11.8 | 87 | + | normal |
| 9H | 11.8 | 80 | + | normal |
| 9I | 11.8 | none | + | normal |

TABLE XII

| Component/value | Wheat flour sample | |
|---|---|---|
| | 10A Treated[a] (invention) | 10B Untreated (control) |
| Moisture (%) | 13.5 | 13.4 |
| Protein (%) | 15.9 | 15.9 |
| Available lysine (%)[b] | 1.8 | 1.9 |
| Fat (%) | 1.8 | 1.9 |
| Crude fiber (%) | 2.3 | 2.5 |
| Ash (%) | 1.8 | 1.8 |
| Water absorption index | 2.6 | 2.3 |
| Water solubility index | 5.1 | 7.5 |
| Birefringence | normal | normal |
| Peroxidase | − | + |
| Fat acidity (0 days) | 30 | 47 |
| Fat acidity (56 days at 49° C.) | 115 | 240 |

[a]Tempered to 15% moisture; 97° C. treatment.
[b]% of protein.

It is understood that the foregoing detailed description is given merely by way of illustration and that modification and variations may be made therein without departing from the spirit and scope of the invention.

I claim:

1. A method for improving the stability of a whole cereal grain without altering its functional properties, wherein said whole cereal grain is selected from the group consisting of millet, wheat, corn, and sorghum, the method comprising the following steps:
   a. heating said whole grain at a moisture content of about 13–17% to a temperature in the range of about 95°–110° C.;
   b. holding the grain at said temperature until substantially all of the peroxidase is inactivated; and
   c. cooling the grain to ambient conditions;
   wherein steps (a)–(c) are conducted in the absence of forces sufficient to cause disruption of the grain's microstructures.

2. A method as described in claim 1 wherein said cereal grain is millet.

3. A method for improving the storage stability of a whole cereal grain without altering its functional properties, wherein said whole cereal grain is selected from the group consisting of millet, wheat, corn, and sorghum, the method comprising the following steps:
   a. tempering said whole grain to a moisture content of about 13–17%;
   b. heating said tempered grain to a temperature in the range of about 95°–110° C.;
   c. holding the grain at said temperature until substantially all of the peroxidase is inactivated; and
   d. cooling the grain to ambient conditions;
   wherein said steps (a)–(d) are conducted in the absence of physical forces sufficient to cause disruption of the grain's microstructures.

4. A method as described in claim 3 wherein said cereal grain is millet.

5. A method for improving the storage stability of a whole cereal grain flour without altering its functional properties, wherein said whole cereal grain is selected from the group consisting of millet, wheat, corn, and sorghum, the method comprising the following steps:
   a. heating said whole grain at a moisture content of about 13–17% to a temperature in the range of about 95°–110° C.;
   b. holding the grain at said temperature until substantially all of the peroxidase is inactivated;
   c. cooling the grain to ambient conditions; and
   d. milling the treated grain from step (c) into a flour;
   wherein said steps (a)–(c) are conducted in the absence of physical forces sufficient to cause disruption of the grain's microstructures.

6. A method as described in claim 5 wherein said cereal grain is millet.

7. A method for improving the storage stability of a whole cereal grain without altering its functional properties, wherein said whole cereal grain is selected from the group consisting of wheat and corn, the method comprising the following steps:
   a. milling the grain into an endosperm fraction and a germ fraction;
   b. heating said germ fraction at a moisture content of about 13–17% to a temperature in the range of about 95°–110° C.;
   c. holding said germ fraction at said temperature until substantially all of the peroxidase is inactivated;
   d. recombining said peroxidase-inactivated germ fraction with said endosperm fraction;
   wherein steps (b) and (c) are conducted in the absence of physical forces sufficient to cause disruption of the grain's microstructures.

8. A method as described in claim 2 wherein said cereal grain is wheat.

9. A method as described in claim 7 wherein said cereal grain is corn.

* * * * *